March 11, 1958 J. O. HELVERN ET AL 2,826,276
BRAKE BOOSTER
Filed Nov. 9, 1954
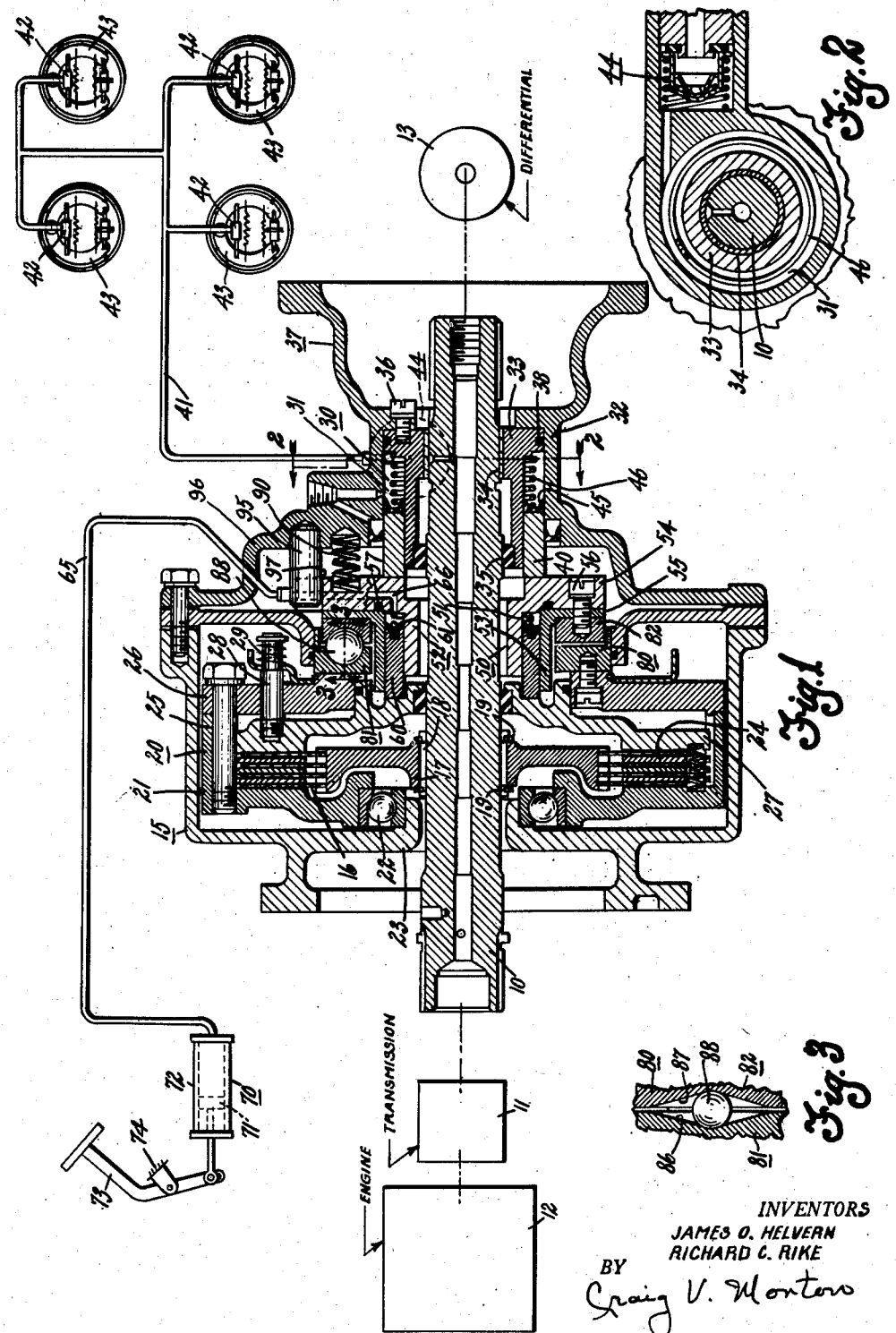
INVENTORS
JAMES O. HELVERN
RICHARD C. RIKE
BY Craig V. Montero
THEIR ATTORNEY

United States Patent Office 2,826,276
Patented Mar. 11, 1958

2,826,276

BRAKE BOOSTER

James O. Helvern, Lewisburg, and Richard C. Rike, Dayton, Ohio, assignors to General Motors Corporation, Detroit, Mich., a corporation of Delaware Application November 9, 1954, Serial No. 467,723

6 Claims. (Cl. 188—152)

This invention relates to mechanisms adapted for power actuation of hydraulic brakes on motor vehicles.

An object of the invention is to provide a source of power actuation for the brakes of a motor vehicle that will be effective for power actuation of the brakes at any time the vehicle is in motion.

Another object of the invention is to provide a power unit for power operation of the hydraulic brakes of a motor vehicle wherein the power unit is operationally connected with the drive shaft or propeller shaft of a motor vehicle so that there will be power available for operation of the power unit whenever the vehicle is in motion, the power unit thereby being effective for power actuation of the brakes whenever the vehicle is in motion irrespective of the availability of the engine for power operation of the drive shaft.

Still another object of the invention is to provide a power unit adapted for power operation of hydraulic brakes of a vehicle wherein a power unit is disposed around the drive shaft or propeller shaft of a motor vehicle between the transmission and differential of the vehicle so that the propeller shaft can power actuate the power unit for power operation of the brakes at any time the wheels of the vehicle are in motion.

It is another object of the invention to provide a power unit in accordance with the foregoing objects wherein the power unit is hydraulically actuated by hydraulic fluid displaced from a fluid displacement device actuated by the brake pedal of the vehicle.

Further objects and advantages of the present invention will be apparent from the following description, reference being had to the accompanying drawings wherein a preferred form of the invention is clearly shown.

In the drawings:

Figure 1 is a cross sectional view of a power unit adapted to be driven by a propeller shaft of a motor vehicle with the unit being diagrammatically connected with a hydraulic brake system.

Figure 2 is a cross sectional view taken along line 2—2 of Figure 1.

Figure 3 is a cross sectional view taken along line 3—3 of Figure 1.

It is common practice today to use power units to aid the application of brakes in motor vehicles to reduce the effort required in applying the brakes. Conventionally, it is the common practice to use power units that are of the differential pressure type with one side of the power unit connected to a source of vacuum, usually the engine manifold. This makes the power unit depend upon engine operation, or in some instances auxiliary vacuum storage tanks or electrically driven vacuum pumps are used to provide a temporary source of vacuum at times when the engine is inoperative. Such systems therefore have the disadvantage of relying upon engine operation for power operation of the brakes of the motor vehicle.

While the above mentioned systems have normally provided satisfactory operation of the brakes of the motor vehicle, yet it is desirable that a source of power be effective for power operation of the brakes at any time the vehicle is in motion regardless of whether or not the engine is operating. Such an operation can be obtained by taking advantage of the fact that the drive shaft or propeller shaft of a motor vehicle is rotated whenever the rear wheels of the vehicle are in motion. At least that portion of the propeller shaft between the differential and the transmission of the vehicle is so rotated. In this invention therefore the power unit is constructed and arranged to utilize fully any rotation of the power shaft or drive shaft to obtain power for power operation of the brakes of the vehicle at any time the rear wheels of the vehicle are in motion.

In this invention the power unit illustrated in Figure 1 includes a rotating drive power shaft 10 that has one end thereof connected to any conventional transmission 11 of a motor vehicle, the transmission in turn being suitably connected with the vehicle engine 12. The opposite end of the power shaft 10 is connected to a conventional universal joint or propeller shaft, the propeller shaft connecting with the conventional differential 13 of a motor vehicle. The power shaft 10 of a power unit 15 will thus be rotated at any time the rear wheels of the vehicle are in motion since the rear wheels are continuously in driving connection with the propeller shaft through the differential 13. The power shaft 10, which in effect becomes a part of the propeller shaft of the motor vehicle constitutes a prime source of power that is available for use at any time the rear wheels of the vehicle are in motion either forwardly or rearwardly.

To pick up power from the power shaft 10, the power unit 15 is provided with a clutch mechanism 20 that includes a set of clutch plates 16 splined upon a support ring 17 that in turn is carried upon the shaft 10 by the spline connection 18. Snap rings 19 retain the support ring axially in place on the spline connection 18.

The clutch mechanism 20 includes a housing member 21 that is supported by the anti-friction bearing 22 on the casing 23, the casing 23 being adapted for attachment to a stationary part of the motor vehicle, usually some part of the transmission casing.

The housing 21 supports a plurality of clutch plates 24 that are held non-rotatable in the housing 21 by a suitable spline connection such as by means of the bolt 25 that also secures the plate member 26 to the housing 21. An actuating plate 27 is also provided within the housing 21, the plate 27 being prevented from rotation relative to housing 21 by the bolt 25. The clutch plates 24 and the actuating plate 27 are axially movable in the housing 21 but non-rotatable relative to the same.

A stud 28 is threaded into the actuating plate 27 and extends through the plate 26, a compression spring 29 providing for normal retraction of the actuating plate 27 relative to the driving plates 16 for declutching of the mechanism.

A fluid displacement device 30 is provided for supplying hydraulic fluid under pressure into the hydraulic brake system of the motor vehicle. The displacement device 30 comprises a cylinder chamber 31 that is created by the space provided between the housing wall 32 and the cylinder member 33 that supports the rotatable shaft 10 by means of a bearing sleeve 34 at one end thereof, a fluid seal 35 being at the opposite end. The cylinder member 33 is secured to the case 37 by a number of cap screws 36 extending between the housing 37 and the member 33. An "O" ring seal 38 closes the periphery of the member 33 against leakage of fluid from the chamber 31.

An annular piston member 40 is reciprocably slidable within the chamber 31 to place fluid under pressure in the chamber 31 and exhaust it into the pipe line 41 that supplies the actuating wheel cylinders 42 of the brakes 43 with hydraulic fluid under pressure for operation thereof. A conventional residual pressure check valve 44 is provided in the pressure line 41 to retain a predetermined residual pressure in the brake lines to the wheel cylinders 42. An annular cup seal 45 is provided on the end of the annular piston 40 and is retained against the same by a compression spring 46 that also provides for return of the piston 40 to the position illustrated in the drawing when the brakes are in their released position.

A second fluid displacement device 50 is placed between the piston 40 of the first fluid displacement device 30 and the actuating plate 27 of the clutch 20 to effect reciprocal actuation of the clutch plate 27 as well as reciprocal action of the piston 40.

The fluid displacement device 50 comprises an annular chamber 51 that is formed by the cylindrical members 52 and 53 having cooperating engaging radial flanges 54 and 55 respectively, the flanges being retained together by means of cap screws 56. An "O" ring seal 57 between the flanges 54 and 55 prevents loss of fluid from the chamber 51.

An annular piston 60 reciprocably slides within the chamber 51 and is provided with a cup seal 61 on the end thereof within the chamber 51. The annular piston 60 engages the actuating plate 27 of the clutch 20 while the flange 54 of the cylindrical member 52 engages the piston 40 of the first fluid displacement device 30. Fluid under pressure is delivered into the chamber 51 of the second fluid displacement device 50 from the pipe line 65 and through the passage 66 in the flange portion 54 from a pedal operated fluid displacement device 70 that includes a piston 71 reciprocable in a cylinder 72. The piston 71 is connected to a foot operated pedal 73 supported upon a pivot 74 whereby fluid is displaced from the cylinder 72 upon actuation of the pedal 73. The displaced fluid is delivered into the chamber 51 of the fluid displacement device 50 to cause relative reciprocable movement between the annular piston 60 and the flanged member 52—54.

A cam mechanism 80 operably connects clutch plates and housing 21 with the piston 40 of the fluid displacement device 30 through the flanged members 52—54 and 53—55, the cam mechanism being of such construction as to translate rotary movement of the driven housing 21—26 into reciprocal motion for movement of the piston 40 into the chamber 31 with power amplification to provide for power actuation of the piston 40 from the power shaft 10 through the clutch mechanism 20.

The cam mechanism 80 comprises a pair of annular rings 81 and 82 secured to the plate 26 and the flanged members 52—54, 53—55 respectively by means of cap screws.

Each of the annular rings 81 and 82 is provided with angularly inclined surfaces 86 and 87 respectively, as shown in Figure 3. A ball 88 is placed between the inclined surfaces 86 and 87 and normally rests in the position shown in Figure 3. The cam mechanism 80 thus comprises a ball and ramp mechanism that effects reciprocal movement between the member 81 and 82 upon relative rotation between these members.

When the brakes 43 of the vehicle are in retracted position, the power device 15 has the component parts thereof in the position illustrated in Figure 1. Under such conditions the power shaft 10 can be rotated to rotate the driving clutch plates 16 between the driven clutch plates 24 without effecting any operation of the power unit.

When the brakes are to be applied during any motion of the vehicle causing the power shaft 10 to be rotated under the power of the rear wheels transmitted to the shaft 10 through the differential 13, the brake pedal 73 will be moved downwardly to effect displacement of fluid from the fluid displacement device 70 into the chamber 51 of the fluid displacement device 50. Fluid entering the chamber 51 will cause the piston 60 to move in a left hand direction and concurrently urge the cylinder of the fluid displacement device 50 in a right hand direction to urge the piston 40 of the fluid displacement device 30 into the cylinder chamber 31 for displacement of hydraulic fluid under pressure into the brake system for actuating the wheel cylinders 42 and thereby the brakes 43. This action will occur regardless of any power operation of the power unit 15.

However, when the piston 60 of the fluid displacement device 50 moves in a left hand direction against the actuating plate 27 of the clutch mechanism 20, the plate 27 and the driven plates 24 engage the driving plates 16 of the clutch mechanism 20. If the power shaft 10 is rotating from any cause, either by power transmission from the engine 12 or by operation thereof through the rear wheel motion being transmited through the differential 13 the shaft 10 will cause rotation of the driving plates 16 to effect rotation of the driven clutch plates 24 and thus the housing 21 and plate 26. The plate 26 which supports the annular ring 81 of the cam mechanism 80 will effect rotation of the ring 81 relative to the annular ring member 82 carried on the cylinder of the fluid displacement device 50. This relative rotation between the ring members 81 and 82 will cause the ball 88 to ride upon the inclined planes 86 and 87 and effect axial sliding of the rings 81 and 82 forcefully as driven by the rotation of the plate 26. This power actuation will be transmitted to the piston 40 of the fluid displacement device 30 through the fluid displacement device 50 and thus apply the power actuation to the piston 40 to compress the fluid in the fluid displacement device 30 and deliver the same into the wheel cylinders 42 of the brakes.

Upon manual release of the brake pedal 73 the component parts of the power unit will return to the positions illustrated in Figure 1, springs 90 being provided to effect return placement of the cam mechanism 80 into its neutral position with the balls resting between the inclined planes 86 and 87 in the position illustrated in Figure 3.

It will be noted that the effort of braking can be felt as a reaction effort through the fluid under pressure in the displacement device 70 since the piston 40 of the displacement device 30 reacts against the cylinder of the displacement device 50, the reaction feel in the brake pedal 73 being received through the fluid under pressure held in the line 65.

The fluid displacement device 50 is prevented from rotation by means of the pin 95 that extends from the wall 96 into a notch 97 provided in the edge periphery of the flange 54 of the cylinder of the fluid displacement device 50.

The driving power applied to the braking effort will be proportional to the braking effort since the hydraulic fluid applied under pressure from the fluid displacement device 70 into the chamber 51 of the fluid displacement device 50 will effect driving engagement between the driving plates 16 and the driven plates 24 of the friction driving device 20 or clutch in proportion to the pressure of the fluid in the chamber 51 and the reaction of the braking effort transmitted through the fluid in the chamber 31 operating against the piston 40. Thus, the driving engagement between the driving plates 16 and the driven plates 24 as well as the actuating plate 27 is not a positive and fixed drive, but rather a sliding or slipping driving engagement with the driving plates 16 rotating at the speed of rotation of the shaft 10 and the driven plates 24 as well as the housing part 20 and the plates 26 and 27 being rotationally driven just sufficient to effect the desired degree of development of pressure in the chamber 31 of the fluid displacement device 30 through the ball and ramp mechanism. If the power shaft 10 is rotating at a relatively low speed, for example, when the vehicle is coasting without benefit of the engine drive, the degree of driving engagement of the friction drive device 20 or clutch is at a higher level than when the shaft 10 is rotated at a high speed under engine drive conditions. Nevertheless in all instances the braking effort powered through the friction drive device or clutch 20 will be proportioned to the specific braking effort required to retard the vehicle with the power transmission through the friction drive device being just sufficient to give the braking effort desired under control of the operator actuating the brake pedal 73.

While the form of embodiment of the invention as herein disclosed constitutes a preferred form, it is to be understood that other forms might be adopted as may come within the scope of the claims which follow.

What is claimed is as follows:

1. A power unit adapted for operation of vehicle brakes, comprising, a rotatable power shaft, a first fluid displacement device including cylinder and piston means arranged annularly around said power shaft for delivery of hydraulic fluid under pressure to a hydraulic brake system, a clutch device comprising first driving plate means carried on said shaft and rotatable therewith and second driven plate means disposed for free rotation relative to said shaft and engageable with said first plate means to effect rotation thereof, a second fluid displacement device including cylinder and piston means arranged annularly about said shaft and disposed between said second plate means and the piston of said first fluid displacement device to effect concurrent reciprocal movement thereof for causing said second plate means to effect engagement between said first and second plate means and concurrently effect displacement of fluid under pressure from said first fluid displacement means, and cam means positioned between said second plate means and the piston of said first fluid displacement device to translate rotary motion of said second plate means into reciprocal motion for power actuation of said piston of said first fluid displacement means upon rotational movement of said second plate means.

2. A power unit in accordance with claim 1 in which the cam means comprises a ball and ramp mechanism with a plurality of balls disposed between inclined planes to effect reciprocal motion between the planes upon relative rotary motion therebetween.

3. A power unit in accordance with claim 1 in which the rotatable power shaft comprises the propeller shaft of a motor vehicle whereby to provide power rotation of the shaft at any time the vehicle is in motion with resultant power availability for power actuation of the first fluid displacement device upon any actuation of said second fluid displacement device.

4. A power unit adapted for operation of vehicle brakes, comprising, a rotatable power shaft, a first fluid displacement device comprising means forming an annularly arranged cylinder around said shaft and an annular piston means reciprocable therein, a clutch means comprising first driving plate means carried on said shaft and rotatable therewith and second driven plate means rotatably disposed relative to said shaft and reciprocable axially thereof for driving engagement with said first plate means to rotate said second plate means thereby upon engagement thereof therewith, a second fluid displacement device including means forming an annular cylinder around said shaft and an annular piston reciprocable therein, said second fluid displacement means being disposed between said second plate means and the piston of said first fluid displacement means with the cylinder and piston thereof engaging respectively the second plate means and the piston of the first fluid displacement means to effect reciprocable movement of each for causing driving engagement of said second plate means with said first plate means and concurrent fluid displacement from said first fluid displacement means upon axial extension of said second fluid displacement means, and cam means positioned between said second plate means and the piston of said first fluid displacement member to effect movement of the said piston upon actuation of the cam means by rotation of said second plate means.

5. A power unit in accordance with claim 4 that includes in the combination a third fluid displacement device manually operated for supply of fluid under pressure to said second fluid displacement device to effect operation thereof with resultant operation of said power unit.

6. A power unit adapted for operation of vehicle brakes, comprising, a rotatable power shaft, a first fluid displacement device including cylinder and piston means therein for delivery of hydraulic fluid under pressure to a hydraulic brake system, a clutch device comprising first driving plate means connected with said shaft and rotatable therewith and second driven plate means engageable with said first plate means for rotational driving of the second plate means, a second fluid displacement device positioned between said second plate means and the piston of said first fluid displacement device to effect engagement of the second plate means with the first plate means and concurrently actuation of said piston of said first fluid displacement device, and cam means positioned between said second plate means and the piston of said first fluid displacement device to translate rotary motion of the second plate means into reciprocal motion to additionally effect actuation of the said piston upon driving engagement of said second plate means with said first plate means.

References Cited in the file of this patent
UNITED STATES PATENTS 2,206,976     Rossmann _____ July 9, 1940
2,289,145     Saives _____ July 7, 1942